Feb. 18, 1941. R. H. CUNNINGHAM 2,232,653
DOUGH DIVIDER
Filed Nov. 9, 1939 6 Sheets-Sheet 3

Inventor
R. H. Cunningham
By Kimmel & Crowell
Attorneys

Feb. 18, 1941.  R. H. CUNNINGHAM  2,232,653
DOUGH DIVIDER
Filed Nov. 9, 1939   6 Sheets-Sheet 6

Inventor
R. H. Cunningham
By Kimmel & Crowell
Attorneys

Patented Feb. 18, 1941

2,232,653

UNITED STATES PATENT OFFICE 2,232,653

DOUGH DIVIDER

Roy Hinckley Cunningham, St. Louis, Mo.

Application November 9, 1939, Serial No. 303,665

28 Claims. (Cl. 107—15)

This invention relates to dough dividers and more particularly to an improved divider structure which is so constructed that it will eliminate the punishment of the dough which is at present caused by dough dividing machines at present in use.

An object of the invention is to provide a dough dividing means which is so constructed that it may be formed with any desired number of dividing means and which will quickly divide the dough or other suitable material in a predetermined quantity.

Another object of this invention is to provide a divider structure of this type which embodies a relatively few number of parts, being simple in construction so that it may be produced at a considerably lower cost than dough dividing machines at present in use.

A further object of this invention is to provide a divider of this type which is compact in structure, light in weight and which is based on the uniflow principal for the dough and which embodies an accurate means for scaling or regulating the quantity of dough or other material which is being divided by the machine.

A still further object of this invention is to provide a divider of this type which eliminates the use of the conventional scaling pocket or chamber, the quantity of dough or other plastic material being regulated by adjustment of the stroke of the suction piston which withdraws the dough or other material from the hopper.

A further object of this invention is to provide a divider of this type including suction pistons or plungers provided with sealing rings so as to increase the suction and coact with the uniflow of the dough by gravity to withdraw the dough from the hopper.

A further object of this invention is to provide an improved connection between the dough dividing means and the suction means so as to provide a substantially self-sealing sliding joint in order to prevent the admission of air into the scaling cylinder during the loading of the cylinder.

A further object of this invention is to provide in a structure of this kind, an improved means for adjusting the dough withdrawing means, the adjusting means being coordinated with the dough forming means and being positioned at an accessible point on the machine so that the operator can readily adjust and determine the quantity of dough which is being withdrawn from the hopper.

Embodying the aims aforesaid and others which may hereinafter appear, the invention consists of the novel construction, combination and arrangement of parts to be more specifically described and as illustrated in the accompanying drawings, but it is to be understood that changes, variations and modifications may be resorted to which fall within the scope of the invention, as claimed.

Referring to the drawings the numeral 15 designates generally a frame structure comprising a base 16, uprights 17 and a table or platform 18 which is secured to the uprights 17. These uprights 17 are constructed in the form of eye beams and the table or platform 18 is substantially solid and is fixedly secured in any suitable manner to the upper ends of the uprights 17.

A substantially conical hopper 19 is disposed above the table 18 and is in an inverted position. The hopper 19 is secured to an annular or cylindrical housing 20 which, at its lower end, is secured to a flanged ring 21 fixed to the top of the table or platform 18. The lower open end or apex of the hopper 19 is provided with a flange or ring 22 and the upper end of a funnel or conveyor, generally designated as 23, engages against the flange or ring 22. The funnel or conveyor 23 is provided at its upper end with a ring or flange 24 which rotatably engages against the under side of the ring or flange 22.

Figure 1:
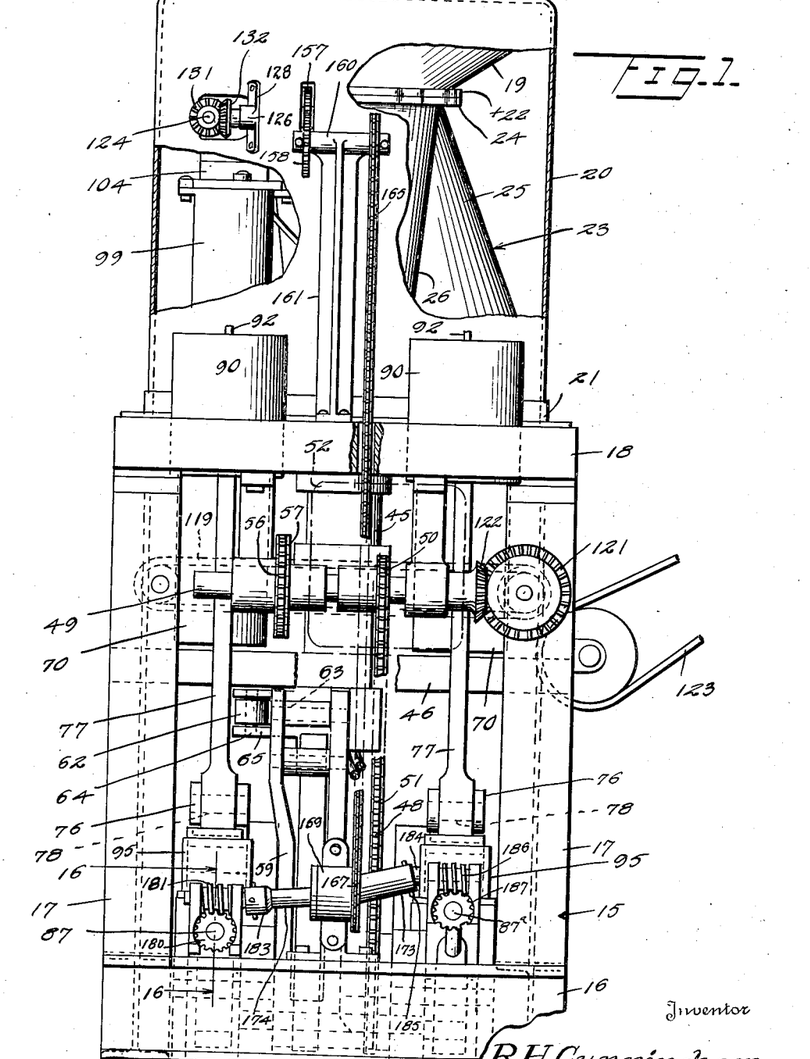
Figure 1 is a detail rear elevational view, partly broken away and in section, of a dough dividing means constructed according to an embodiment of this invention.
Figure 2:
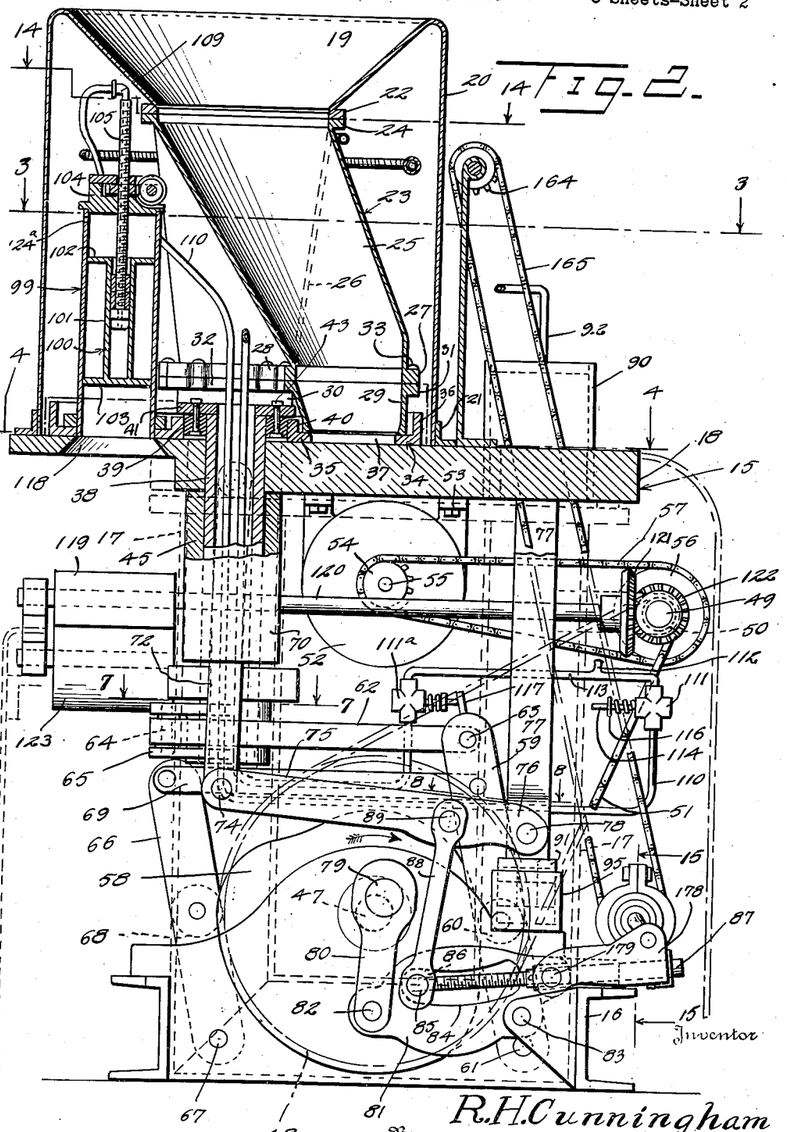
Figure 2 is a detail side elevation, partly in vertical section, of the machine.
Figure 3:
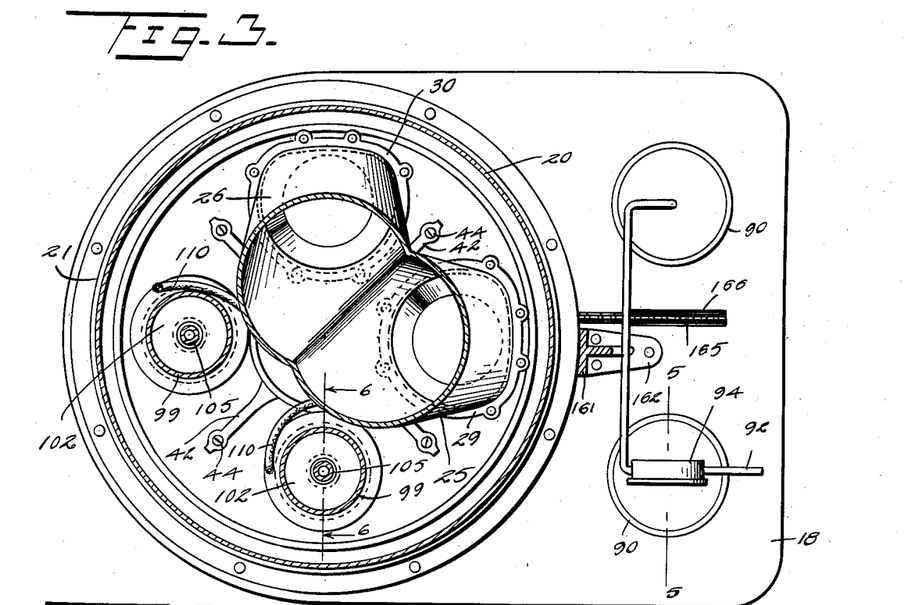
Figure 3 is a sectional view taken on the line 3—3 of Figure 2.
Figure 4:
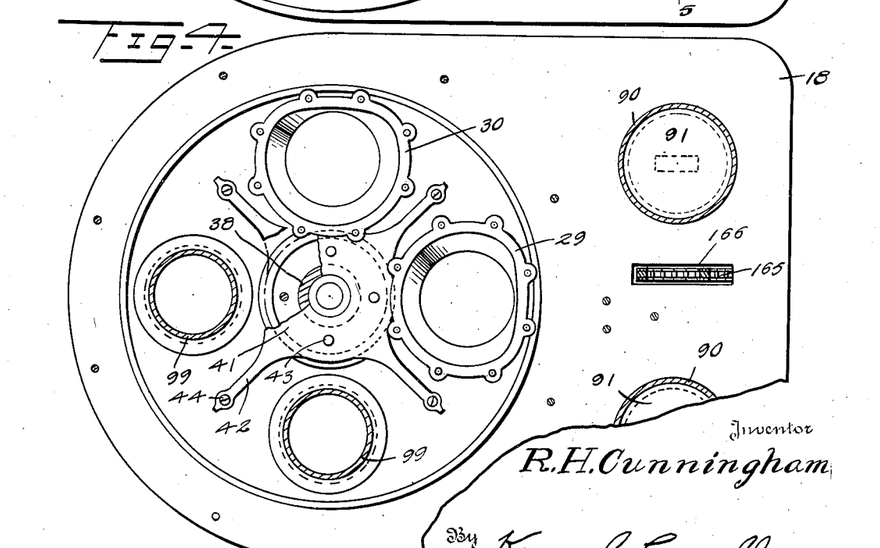
Figure 4 is a sectional view taken on line 4—4 of Figure 2.
Figures 5, 6, 7, 8, 9, 10:
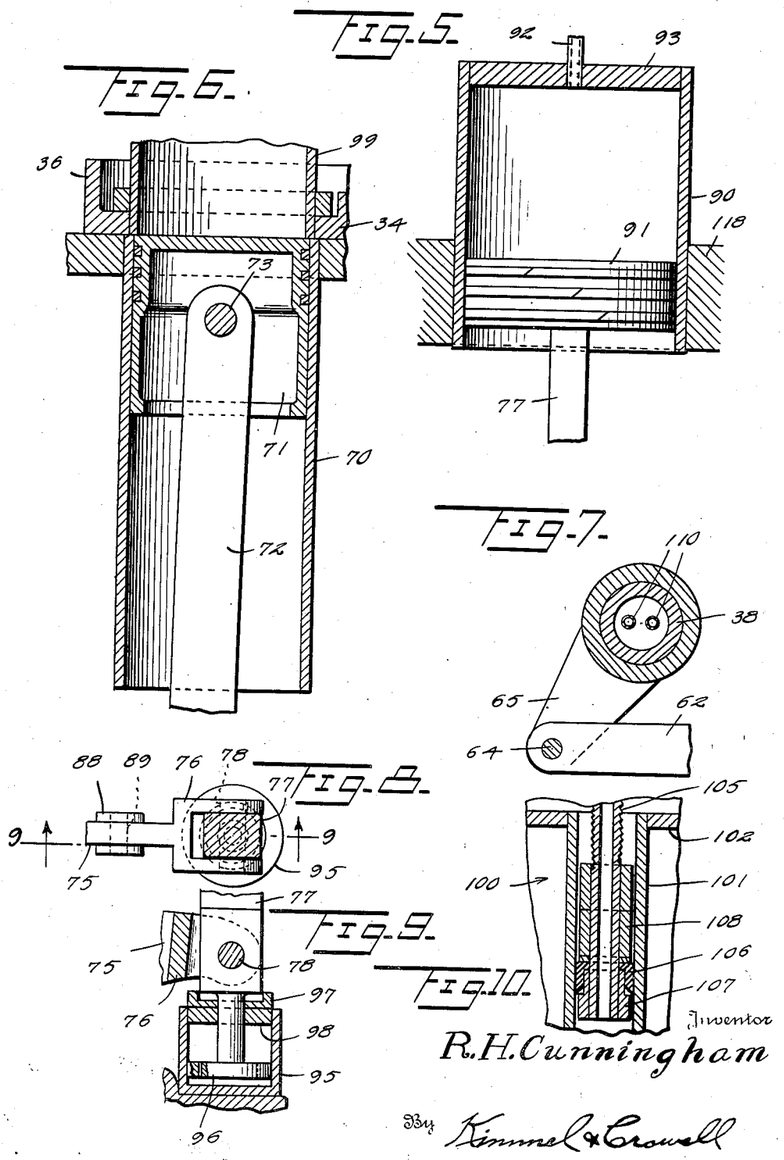
Figure 5 is an enlarged fragmentary sectional view taken on line 5—5 of Figure 3.
Figure 6 is an enlarged fragmentary sectional view taken on line 6—6 of Figure 3.
Figure 7 is a sectional view, taken on line 7—7 of Figure 2.
Figure 8 is an enlarged fragmentary sectional view taken on the line 8—8 of Figure 2.
Figure 9 is a sectional view taken on the line 9—9 of Figure 8.
Figure 10 is an enlarged fragmentary vertical section of the dough discharging means for discharging the dough onto the endless conveyor.
Figures 11, 12, 13, 17:
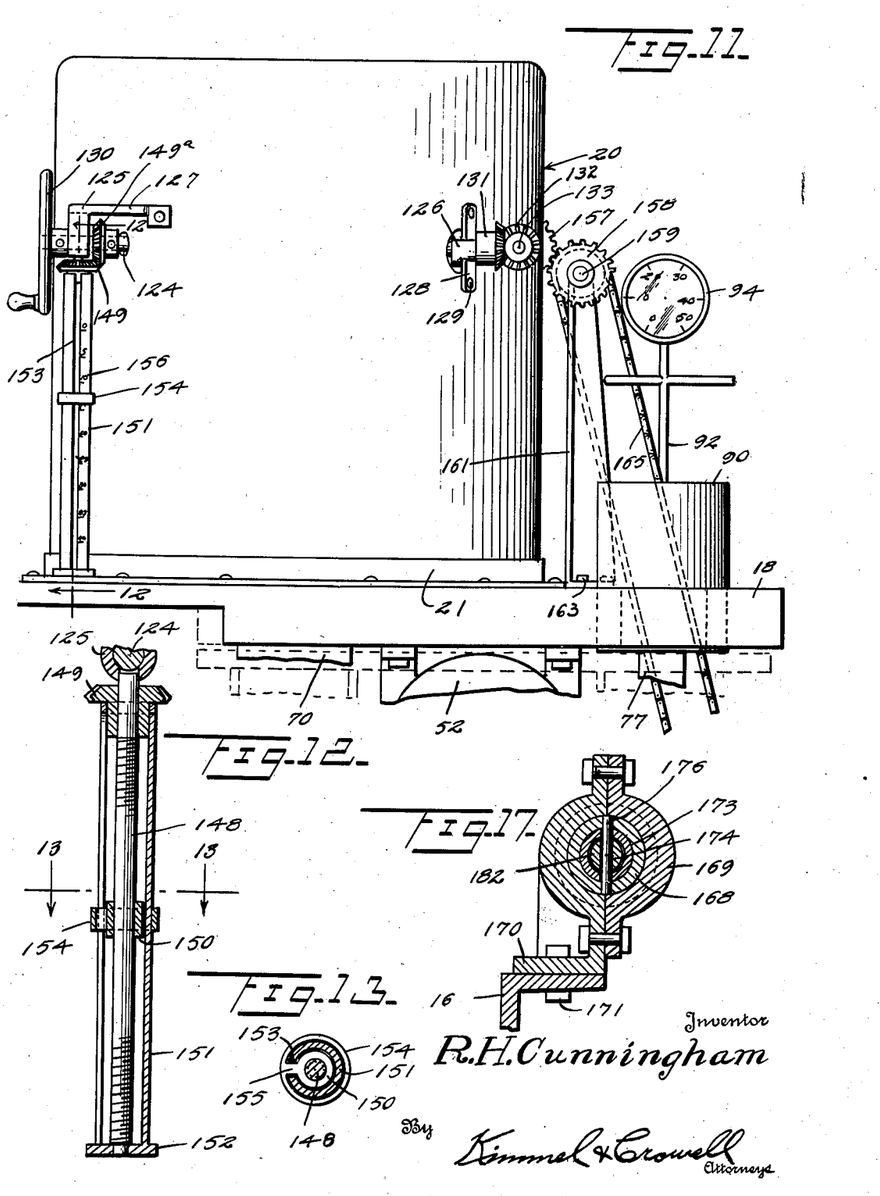
Figure 11 is a fragmentary side elevation of the upper portion of the machine showing the scale cylinder adjusting means.
Figure 12 is an enlarged fragmentary sectional view taken on the line 12—12 of Figure 11.
Figure 13 is a sectional view taken on the line 13—13 of Figure 12.
Figure 17 is a sectional view taken on the line 17—17 of Figure 15.
Figure 14:
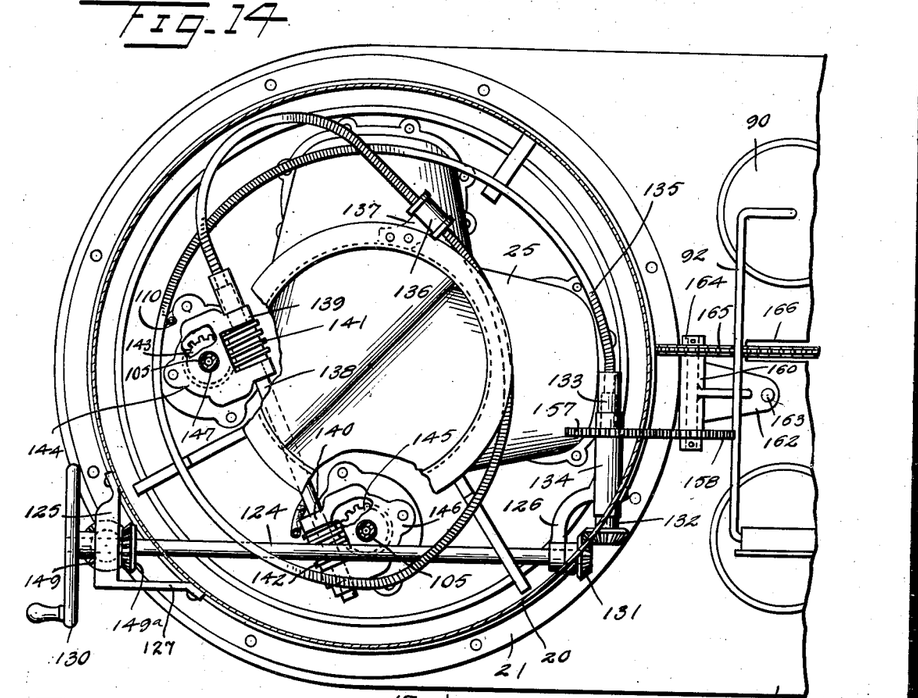
Figure 14 is a sectional view, partly in detail, taken on the line 14—14 of Figure 2.
Figures 15, 16:
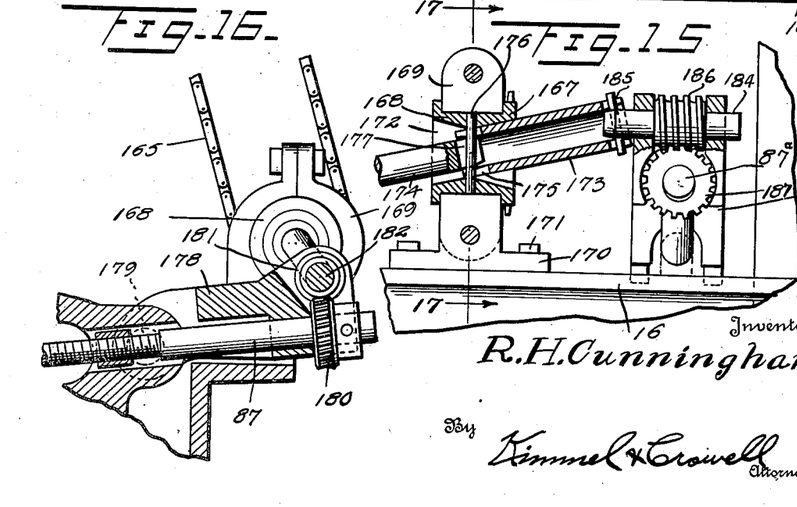
Figure 15 is a fragmentary sectional view taken on the line 15—15 of Figure 2.
Figure 16 is an enlarged fragmentary sectional view taken on the line 16—16 of Figure 1.

The funnel 23, at its upper end, is of annular construction and comprises a pair of downwardly tapering branches 25 and 26 which are formed integral with each other and which, at their upper ends merge into the annular upper portion of the funnel 23. The lower reduced ends of the funnel members 25 and 26 are provided with the flanges 27 and 28 respectively which are secured to the upper side of a pair of coupling members 29 and 30 having flanges 31 and 32 which are secured to the flanges 27 and 28 by fastening devices 33. The coupling members 29 and 30 are secured to the upper side of a rotatable plate or dough cutting or dividing means, generally designated as 34. This plate 34 comprises a substantially disk shaped member 35 provided with an upstanding flange 36 which is disposed within the annular housing 20. The lower ends of the coupling members 29 and 30 may be secured in any desired manner to the plate 35 so that the coupling members 29 and 30 will oscillate or rotate with the plate 35. The plate 35 is provided with an opening 37 aligning with the coupling members or necks 29 and 30 and preferably the plate 35 is provided with two openings 37, one for each coupling member, and these openings are spaced apart substantially 90°, as shown in Figures 3 and 4.

A hollow shaft 38 is rotatably disposed through the table 18 and a ring or annulus 39 is keyed onto the upper end of the shaft 38. The annulus 39 engages in an upstanding flange or boss 40 which is formed integral with the plate 35 in the axial center thereof. A clamping member, comprising an annular body or plate 41 provided with a plurality of radially arranged arms 42, is secured, as by fastening means 43, to the ring or annulus 39. The radial arms 42 are secured to the plate 35 by fastening means 44 and preferably the plate 41 and the arms 42 are formed of substantially resilient construction so that tightening of the fastening members 44 will tension the arms 42 and form means to resiliently resist upward thrust of the hollow shaft 38. The shaft 38 is rotatably carried by a bearing structure 45 extending below the table 18, and the lower end of the shaft 38 is rotatable in a bearing carried by a horizontal support 46 which is secured between a pair of the uprights 17 below the table 18.

A rotatable drive shaft 47 is journalled in the frame structure 15, above the base 16, and has secured thereto a sprocket 48. A counter-shaft 49 is rotatably carried by the frame 15 at one side thereof and a sprocket 50 is fixed to the shaft 49 and has a chain or flexible member 51 trained there-about. The chain or flexible member 51 also engages about the sprocket 48 so that rotation of the counter-shaft 49 will effect rotation of the drive shaft 47. A power member or motor 52 is secured beneath the table or platform 18 by fastening means 53 and has a sprocket 54 secured to the shaft 55 thereof. A second sprocket 56 is secured to the counter-shaft 49 and a flexible member 57 in the form of a chain engages the sprockets 54 and 56. A cam 58 is fixed to the shaft 47 and a rock lever or link 59, having a roller 60, is engageable with the marginal edge of the cam 58. The rock lever 59 is pivoted at its lower end, as at 61, with the frame 15, and the upper end of the lever 59 has a link 62 pivotally secured thereto as at 63. The link 62, at its opposite end, engages a pin 64 carried by a crank 65 which is fixed to the lower end of the shaft 38. Preferably the crank 65 is of bifurcated construction and the link 62 engages between the two arms of the crank 65.

A second rock lever 66 is pivotally mounted, as at 67, in the frame 15, and is provided with a roller 68 engaging the cam 58 opposite from the roller 60, and the upper end of the lever 66 is connected to the lever 59 by means of a tie rod or link 69. In this manner the lever 59 is rocked forward and back by engagement of the rollers 60 and 68 on the exterior of the cam 58.

A suction cylinder 70 is secured to the table 18, and extends downwardly therefrom. A piston 71 is slidable in the cylinder 70 and has pivotally secured thereto the upper end of a piston rod 72, as by a wrist pin 73. The connecting rod 72 extends below the cylinder 70 and is pivotally secured as at 74 to one end of a rock lever 75. The rock lever 75, at the opposite end thereof, is provided with a fork 76 between the arms of which a vertically disposed rod or link 77 engages. The rod or link 77 is secured to the arms of the fork 76 as by a pin 78. The drive shaft 47 is provided with a crank member 79 which may be secured to one side of the cam 58 and a rock arm 80 is rockably mounted at one end on the crank 79. A lever 81 is pivotally secured at one end, as at 82, to the lower end of the arm 80, and is pivotally secured at the opposite end, as at 83, to the frame 15, adjacent the lower portion thereof. The lever 81 is constructed in the form of a plate, which, intermediate the pivotal members 82 and 83, is provided with an arcuate slot 84. A pin 85 has one end thereof mounted within the slot 84 and preferably the pin 85 is provided with an enlarged portion 86 slidable in the slot 84. An elongated pin adjusting rod 87 is threaded through the enlarged portion 86 which is slidable in the arcuate slot 84. In this manner the position of the pin 85, relative to the slot 84, may be adjusted by turning the rod or adjusting member 87. A link 88 is pivotally mounted at its lower end on the pin 85, and pivotally mounted at its upper end on a pin 89 carried by the lever 75 inwardly from the fork 76. In this manner rocking of the lever 81 under the rocking action of the arm 80, carried by the crank 79, will effect vertical rocking movements of the lever 75.

A cushioning cylinder 90 is carried by the table 18, laterally of a cylinder 70 and a piston 91 is slidable in the cylinder 90. An air pressure pipe line 92 is connected to the head 93 of the cylinder 90 and is adapted to be connected to a suitable source of air pressure supply in order to provide a desired pressure between the head 93 and the piston 91 and thus cushion the upward movement of the piston 91 as this piston 91 is moved upwardly by upward movement of the link 77. A pressure gauge 94 may be connected to the pipe 92 so that the operator will be able to provide the desired amount of pressure in the cylinder 90 so as to cushion the movement of the piston 91. This cushioning movement of the piston 91 will have the effect of providing a cushioning means for the piston 71 in its upward movement or discharge stroke, as will be hereinafter described. The downward movement of the piston 91 is cushioned by means of a dash pot 95 within which the lower end of the link 77 engages. A piston 96 is slidable in the dash pot 95 and a cushioning washer 97 is interposed between the lower end of the link 77 and the head 98 of the dash pot 95. When the opening 37 is in registry with the upper end of the cylinder 70 the piston 71 will be at the top of its stroke, and will then be moved downwardly by downward rocking of the lever 75. The downward rocking of this lever 75 is timed through the cam 58. Downward movement of the piston 71 will draw into the cylinder 70 dough from the funnel or tapering member 25. After the piston 71 reaches the lower end of its suction stroke the shaft 38 will be partially rotated so as to rotate the plate member 34, thus cutting off the dough in the cylinder 70 from the dough remaining in the coupling member 29. The marginal edges of the opening 37 engaging the flat top of the table 18 form a cutting means whereby the dough will be cleanly cut. A discharge cylinder 99 is fixed to the plate 34 in a position substantially 90° from the funnel 25, and extends upwardly from the plate 34 within the cylindrical housing 20. A piston, generally designated as 100, is slidable in the cylinder 99 and comprises a tubular or cylindrical member 101 provided with an upper wall or plate 102 and a lower wall or head 103. The cylinder 99 is provided with a head 104 and a tubular member 105 engages through the head 104. This tubular member 105 is disposed within the cylindrical member 101 forming part of the piston 100 and is provided at its lower end with a cup-shaped gasket or sealing member 106 secured to the lower end of the tubular member 105, by means of a nut 107. Guide members 108 are carried by the tubular member 105 above the gasket 106 and slidably engage within the cylindrical member 101. The tube or pipe 105 has a pipe connection 109 connected to the upper end thereof, and this connection 109 has one end of an air pipe 110 connected thereto. The hose or pipe 110 extends downwardly in the housing 20, and extends down through the hollow shaft 38. The hose or pipe 110 is connected to a valve 111 which is connected to a supply pipe 112 by means of a pipe connection 113.

The valve 111 is of a construction such that normally the pipe 110 will communicate through the valve 111 to the asmosphere. A valve stem or operator 114 extends from the valve housing or member 111 and is normally urged to a position closing the pipe connection 113 by means of a spring 115 which bears against a collar 116 secured to the stem. The lever 59, at its upper end, is provided with an upwardly projecting lug or arm 117 which, in one position of the lever 59, is adapted to engage the stem 114 so as to establish communication from the supply pipe 112 and the connection 113 to the pipe 110. When the stem 114 is pushed inwardly by the lug 117 the open port of the valve member 111 will be closed and the air pressure from the supply pipe 112 will pass through the housing 111 and the pipe 110 into the cylindrical member 101. The air pressure in the cylindrical member 101 will force the piston 100 downwardly and thus discharge the dough in the cylinder 99 through a discharge port 118 which is carried by the table 18. An endless conveyor 119 is mounted below the discharge port 118 and is operated from a drive shaft 120, which is journalled in the frame 15. One end of the shaft 120 is provided with a bevelled gear 121 meshing with a bevelled gear 122 which is fixed to the counter shaft 49. A second conveyor 123 is positioned with one end portion below the discharge end of the conveyor 119 and is adapted to convey the dough discharged from the cylinder 99 to a suitable point remote from the frame 15.

In the machine hereinbefore described there are two suction cylinders 70 secured to the table 18, and it will be understood that the hereinbefore described structure associated with the cylinder 70 will apply equally as well to the second cylinder 70 wherein the piston is adapted to move oppositely from the piston 71. In other words when one piston 71 is moving upwardly on its discharge stroke, for discharging the dough into the discharge cylinder 99, the second piston is in registry with the coupling member 30 and is moving downwardly on its suction stroke. A second valve member 111a is connected to the coupling member 113 and is adapted to be engaged by the lug 117 when the lever 59 is opposite from the valve 111. This valve 111a is connected to the second discharge cylinder, similar to the cylinder 99.

An adjusting shaft 124 is journaled in bearings 125 and 126 which are secured to the housing 20. The bearing 125 is provided with a bracket or supporting arm 127 which is adapted to be secured to the exterior of the housing 20 and the bearing 126 is provided with supporting arms 128 which are secured by fastening members 129 to the housing 20. The shaft 124 is disposed in a substantially horizontal position and is positioned above the upper ends of the secondary scaling cylinders 99. A hand wheel 130 is secured to the outer end of the shaft 124 and provides means whereby the shaft 124 may be selectively rotated as will be hereinafter described.

Shaft 124, at the end opposite from the hand wheel 130, is provided with a bevelled gear 131 which meshes with a gear 132. The gear 132 is carried by a stub shaft 133 journalled in a bearing 134 which is formed integral with the bearing structure 126 and extends at right angles to the shaft 124. A flexible shaft 135 is secured at one end to the stub shaft 133 and is extended about the tapered conveying members 25. A supporting bearing 136, carried by a bracket 137 is secured to the conveying structure 25 and engages the flexible shaft 135 to support this shaft in the housing 20. The opposite end of the flexible shaft 135 is secured to a counter shaft 138 which is supported in bearings 139 and 140 carried by the heads 104 of the secondary scaling cylinders 99. A pair of worms 141 and 142 are fixed to the shaft 138 and the worm 141 meshes with a worm gear 143 which is mounted in a bearing or cap structure 144 on top of one of the heads 104. A second worm gear 145 meshes with the worm 142 and is mounted in a bearing or cap structure 146 positioned on top of the head structures 104. The worm gears 143 and 145 are of identical construction and the parts associated therewith are also of identical construction so that the description of one of these worm gears and its associated parts will apply equally as well to the other of the worm gears.

The worm gear 143 is provided with a threaded bore 147 in which the tubular member 105 threadably engages. This tubular member 105 is provided with exterior threads so that rotation of the worm gear 143 will either raise or lower the tubular member 105. The effect of this is to limit the movement of the secondary scaling piston 100 in its upward movement. By connecting the two worms 141 and 142 to the counter shaft 138 the two piston adjusting members 105 can be adjusted as a unit upon rotation of the shaft 124 and a consequent rotation of the worms 141 and 142 together with the worm gears 143 and 145.

In order to provide a means whereby the operator of the machine can determine at a glance the amount of dough which may be discharged into the secondary cylinder 99 I have provided a gauge structure including a threaded shaft 148 which has a gear 149 adjacent the upper end thereof. The upper end of the shaft 148 is journalled in the bearing structure 125. The annular nut 150 is threaded onto the shaft 148 and is slidably disposed in a vertically disposed cylindrical member 151 provided with a base 152 which may be secured to the platform 18 exteriorly of the housing 20. This tubular member 151 is provided with an elongated vertical slot 153 and an annular gauge member 154 loosely engages about the tubular member 151 and is connected to the nut 150 by an extension 155 which loosely engages through the slot 153. The tubular member 151 is provided with a plurality of gauge marks 156 on the exterior thereof adjacent the slot 153.

The shaft 124 may also be used for the purpose of adjusting the primary scaling piston 71 and in order to accomplish this the stub shaft 133 is provided with a gear 157 which meshes with a secondary gear 158 mounted on a counter shaft 159. The counter shaft 159 is journalled in a bearing 160 positioned on the upper end of a vertical support 161. The support 161 is provided with a base 162 which is secured, as by fastening members 163, to the upper surface of the table or platform 18. A sprocket 164 is fixed to the counter shaft 159 and a chain or flexible member 165 is trained over the sprocket 164 and extends downwardly through an opening 166 provided in the table or platform 18. A lower sprocket 167 is carried by a hollow shaft 168 journalled in the bearing 169 which is provided with base flanges 170. The base flanges 170 are secured, as by fastening members 171, to the base beam members 16. The shaft 168 is provided with a pair of opposite, frustro-conical openings 172 and a pair of telescoping shafts 173 and 174 are loosely disposed in the openings 172. The shaft 173 is preferably hollow and is provided at one end thereof with a pair of slots 175 in which a pin 176 carried by the shaft 168, loosely engages. The shaft 174 is provided with a slot 177 in which the pin 176 is received and the adjacent end of the shaft 174 telescopes partly into the adjacent end of the tubular shaft 173. By providing a construction of this kind the two shafts 173 and 174 may have substantially universal movement relative to the shaft 168.

The threaded shaft 87 has a yoke 178 which is mounted on a pivot member 179 carried by the outer end of the lever 81. The shaft 87 has a worm gear 180 fixed thereto which meshes with a worm 181 mounted on the stub shaft 182. The stub shaft 182 is connected to the shaft 174 through a substantially universal connection 183. The tubular shaft 173 is connected to a stub shaft 184 through a substantially universal connection 185 and a worm 186 is fixed to the stub shaft 184. This worm 186 meshes with a worm gear 187 which is carried by the second adjusting shaft 87a. The shaft 87a is connected to an adjusting mechanism similar to the shaft 87 and the description of the parts correlated with the shaft 87 will apply equally as well with the shaft 87a.

In the use and operation of this machine the dough is initially discharged into the hopper 19, and moves downwardly in the rotatable member 23. The motor 52 will, through the flexible members 57 and 51, rotate the shaft 47. Rotation of the shaft 47 will effect periodic rotation or oscillation of the plate 34 through the medium of the cam 58. This cam 58 is so constructed as to have a dwell period at the time the cylinder 70 is in registry with the opening 37 in the plate 34. At this time the lever 75 will be rocked downwardly so as to pull the piston 71 downwardly and draw the dough into the cylinder 70. When the piston 71 is at the bottom of its suction stroke the plate 34 will be partially rotated so as to bring the cylinder 99 into registry with the cylinder 70. This rotary movement of the plate 34 is effected quickly and after the plate 34 is in the position with the discharge cylinder 99 registering with the suction cylinder 70 the lever 75 is rocked upwardly so as to force the dough from the cylinder 70 into the discharge cylinder 99. The inward movement of the dough into the discharge cylinder 99 will move the discharge piston 100 upwardly in the cylinder 99. At this time the valve 111 is open to the atmosphere so that the air in the upper portion of the cylinder 99 and the inner cylinder or tubular member 101 will be discharged into the atmosphere. Preferably the head 104 of the cylinder 99 may be provided with an air vent 124a to admit of the exhaust of the air above the upper head 102 of the piston 100. After the dough has been discharged into the cylinder 99 the shaft 38 will be rocked to rotate the plate 34 and bring the cylinder 70 back into registry with the opening 37 in the plate 34 where the cycle may be repeated. When the plate 34 has the opening 37 therein registering with the cylinder 70, the cylinder 99 will be in registry with the discharge opening 118 in the table 19. At this time the lug 117 will engage the valve stem 111 so as to communicate the air pipe 110 with the supply pipe 112. The air pressure in the pipe 110 will force the piston 100 downwardly so as to discharge the dough from the cylinder 99 onto the conveyor 119. This conveyor 119 will then discharge the dough pieces to the conveyor 123.

A machine constructed according to this invention will eliminate the use of the scaling cylinder at present forming a part of a dough dividing machine. The cylinder 70 constitutes a combined suction and sizing or scaling cylinder in view of the fact that the movement of the piston 71 can be regulated by adjustment of the link 88 relative to the lever 81. This adjustment is regulated by the threaded adjusting rod 87 which adjusts the fulcrum for the lower end of the link 88 in the length of the slot 84. The slot 84 is of such configuration and so positioned relative to the lever 81 that when the pivot member 85 is adjusted along the length of the slot 84 the piston 71 will, at all times, terminate in its upward movement at the upper end of the cylinder 70. Adjustment of the pivot member 85 controls the length of the downward stroke of the piston 71 and in this manner regulates the amount of dough which is drawn into the cylinder 70 by downward movement of the piston 71. The upward rocking of the lever 75 is cushioned by the cushioning cylinder 90. The desired amount of air pressure is supplied to the cylinder 90 through the pipe 92 so that when the link 88 initially moves upwardly the pressure of the link 88 on the lever 75 will be communicated to the link 77 and thus force the piston 91 upwardly until the air in the cylinder 90 prevents further upward movement of the piston 91. At this time the link 77 will be stationary and further upward movement of the link 88 will effect upward rocking of the piston operating lever 75. When the link 88 is pulled downwardly by downward rocking of the lever 81 the link 77 will likewise be pulled downwardly and the downward movement of the link 77 will be cushioned by the dash-pot 75. This cushioning of the lever 75 will prevent pounding against the dough as the dough is being discharged from the cylinder 70 into the discharge cylinder 99.

The movement of the primary scaling piston 71 in the cylinder 70 may be regulated by adjustment of the hand wheel 30 which, through the shaft 124, gear train 131, 132, 157 and 158, will adjust the position of the link 87. This is accomplished by moving the chain 165 which will rotate the shafts 73 and 174 so as to turn the adjusting shaft 87. Rotation of the shaft 87 will move the pin 85 to the desired position in the length of the arcuate slot 84. At the same time that the stroke of the piston 71 is adjusted the rotation of the shaft 124 will rotate the flexible shaft 135 which will, in turn, vertically move the threaded piston controlling member 105. Normally the piston 100 is permitted movement within the cylinder 99 substantially greater than the area which will be occupied by the dough or material received in the cylinder 99 so that when the primary piston 71 forces the dough into the cylinder 99 the dough will not be placed under excessive pressure.

Adjustment of the hand wheel 130 will also vertically move the gauge member 154 which will rotate through the gear train 149 and 149a. The gear 149a is fixed to the shaft 124 and meshes with the gear 149 so as to effect rotation of the threaded shaft 148. Rotation of the shaft 148 will move the nut 150 vertically in the tube 151 and at the same time the gauge member 154 will move with the nut 150 so that the operator of the machine will be able to determine the amount of dough which will be received in the primary cylinder 70 and the secondary cylinder 99 through the adjustment of the strokes of the pistons 71 and 100 respectively.

With a construction of this kind, by eliminating the possibility of air entering the cylinder 70 during the down-stroke of the piston 71, the machine may be run at a high speed without causing punishment to the material which is being operated upon. The yieldable securing means in the form of the yielding arms 42 which hold the plate 34 onto the table or platform 18 will prevent any air from entering the cylinder 70 during the movement of the piston 71. In this manner the only air which may enter the piston 70 must pass through the tubular conveying members 25 from the hopper 19. It will, therefore, be seen that atmospheric pressure together with gravity, will cause the dough or plastic material to flow evenly downwardly through the tubular conveying members 25 and that the partial vacuum formed by the down stroke of the piston 71 will cause the dough to quickly move downwardly into the cylinder 70.

What I claim is:

1. A dough divider comprising a hopper, suction means withdrawing a quantity of dough from the hopper and transferring the dough withdrawn from the hopper to a combined receiving and forming means, means for discharging the dough from said latter means, and means connected to said suction means and said discharge means for simultaneously adjusting said suction means and said discharge means to thereby regulate the quantity and size of dough withdrawn from the hopper and discharged from the discharge means.

2. A dough divider comprising a hopper, suction means for intermittently withdrawing a quantity of dough from the hopper, a combined dough receiving and forming means, means for intermittently shifting said withdrawing means into registry with said receiving and forming means for discharging the dough from said withdrawing means to said receiving and forming means, means for discharging the dough from said receiving and forming means, and means connected to said suction means and said discharge means for simultaneously adjusting said suction means and said discharge means to thereby regulate the quantity and size of dough withdrawn from the hopper and discharged from the discharge means.

3. A dough divider comprising a hopper, suction means for intermittently withdrawing a quantity of dough from the hopper, a combined dough receiving and forming means, means for intermittently shifting said withdrawing means into registry with said receiving and forming means for discharging the dough from said withdrawing means to said receiving and forming means, fluid actuated means for discharging the dough from said receiving and forming means, and means connected to said suction means and said discharge means for simultaneously adjusting said suction means and said discharge means to thereby regulate the quantity and size of dough withdrawn from the hopper and discharged from the discharge means.

4. A dough divider comprising a hopper, suction means for intermittently withdrawing a quantity of dough from the hopper and for regulating the quantity of dough withdrawn from said hopper, a combined dough receiving and forming means, means for intermittently discharging the dough from said withdrawing means to said receiving and forming means, means for discharging the dough from said receiving and forming means, and means connected to said suction means and said discharge means for simultaneously adjusting said suction means and said discharge means to thereby regulate the quantity and size of dough withdrawn from the hopper and discharged from the discharge means.

5. A dough divider comprising a frame, a hopper fixed to said frame, means carried by said frame for intermittently withdrawing dough from said hopper, a movable member interposed between said hopper and said dough withdrawing means, said movable member including a funnel-shaped body fixed to said movable member to thereby communicate said hopper with said dough withdrawing means in one position of said movable member, operating means for said movable member, a dough forming member carried by said movable member and adapted to be positioned in registry with said withdrawing means in another position of said movable member, and means operable when said body is in a position communicating said hopper with said withdrawing means for discharging the dough from said forming means.

6. A dough divider comprising a frame, a hopper fixed to said frame, means carried by said frame for intermittently withdrawing dough from said hopper, adjustable means regulating the quantity of dough withdrawn by said withdrawing means, a movable member interposed between said hopper and said dough withdrawing means, said movable member including a funnel-shaped body fixed to said movable member to thereby communicate said hopper with said dough withdrawing means in one position of said movable member, operating means for said movable member, a dough forming member carried by said movable member and adapted to be positioned in registry with said withdrawing means in another position of said movable member, and means operable when said body is in a position communicating said hopper with said withdrawing means for discharging the dough from said forming means.

7. A dough divider comprising a frame, a hopper fixed to said frame, means carried by said frame for intermittently withdrawing dough from said hopper, a movable member interposed between said hopper and said dough withdrawing means, said movable member including a funnel-shaped body fixed to said movable member to thereby communicate said hopper with said dough withdrawing means in one position of said movable member, operating means for said movable member, a dough forming member carried by said movable member and adapted to be positioned in registry with said withdrawing means in another position of said movable member, and fluid actuated means operable when said body is in a position communicating said hopper with said withdrawing means for discharging the dough from said forming means.

8. A dough divider comprising a frame, a hopper fixed to said frame, reciprocable means carried by said frame for intermittently withdrawing a quantity of dough from said hopper, a movable member between said hopper and said reciprocable means, an open ended body carried by said movable member communicating said hopper with said reciprocable means in one position of said movable member, operating means for said movable member, a combined receiving and forming member fixed to said movable member and adapted in another position of said movable member to be disposed in registry with said reciprocable means, and means active when said receiving and forming member is out of registry with said reciprocable means for discharging the dough from said receiving and forming means.

9. A dough divider comprising a frame, a hopper fixed to said frame, reciprocable means carried by said frame for intermittently withdrawing a quantity of dough from said hopper, a movable member between said hopper and said reciprocable means, an open ended body carried by said movable member communicating said hopper with said reciprocable means in one position of said movable member, operating means for said movable member, a combined receiving and forming member fixed to said movable member and adapted in another position of said movable member to be disposed in registry with said reciprocable means, means engageable with a portion of said operating means for said reciprocable means and active when said receiving and forming member is out of registry with said reciprocable means for discharging the dough from said receiving and forming means.

10. A dough divider comprising a frame, a hopper fixed relative to said frame, reciprocable means carried by said frame for intermittently withdrawing a quantity of dough from said hopper, means for adjusting the length of stroke of said reciprocable means to thereby control the quantity of dough withdrawn by said reciprocable means, a movable member interposed between said hopper and said reciprocable means, a tapered open ended body fixed to said movable member and communicating said hopper with said reciprocable means, operating means for said movable member, a combined receiving and forming cylinder carried by said movable member and adapted in one position of said movable member to be disposed in registry with said reciprocable means, a piston slidable in said cylinder, and means operatively connected with said cylinder and said reciprocable means for moving said piston in said cylinder to thereby discharge the dough therefrom.

11. A dough divider comprising a frame, a hopper fixed relative to said frame, reciprocable means carried by said frame for intermittently withdrawing a quantity of dough from said hopper, means for adjusting the length of stroke of said reciprocable means to thereby control the quantity of dough withdrawn by said reciprocable means, means cushioning the movement of said reciprocable means in one direction, a movable member interposed between said hopper and said reciprocable means, a tapered open ended body fixed to said movable member and communicating said hopper with said reciprocable means, operating means for said movable member, a combined receiving and forming cylinder carried by said movable member and adapted in one position of said movable member to be disposed in registry with said reciprocable means, a piston slidable in said cylinder, and means operatively connected with said cylinder and said reciprocable means for moving said piston in said cylinder to thereby discharge the dough therefrom.

12. A dough divider comprising a frame, a hopper fixed relative to said frame, reciprocable means carried by said frame for intermittently withdrawing a quantity of dough from said hopper, means for adjusting the length of stroke of said reciprocable means to thereby control the quantity of dough withdrawn by said reciprocable means, means cushioning the movement of said reciprocable means in both directions, a movable member interposed between said hopper and said reciprocable means, a tapered open ended body fixed to said movable member and communicating said hopper with said reciprocable means, operating means for said movable member, a combined receiving and forming cylinder carried by said movable member and adapted in one position of said movable member to be disposed in registry with said reciprocable means, a piston slidable in said cylinder, and means operatively connected with said cylinder and said reciprocable means for moving said piston in said cylinder to thereby discharge the dough therefrom.

13. A dough divider comprising a frame, a hopper fixed relative to said frame, reciprocable means carried by said frame for intermittently withdrawing a quantity of dough from said hopper, means for adjusting the length of stroke of said reciprocable means to thereby control the quantity of dough withdrawn by said reciprocable means, means cushioning the movement of said reciprocable means, means regulating the degree of cushioning of said cushioning means, a movable member interposed between said hopper and said reciprocable means, a tapered open ended body fixed to said movable member and communicating said hopper with said reciprocable means, operating means for said movable member, a combined receiving and forming cylinder carried by said movable member and adapted in one position of said movable member to be disposed in registry with said reciprocable means, a piston slidable in said cylinder, and means operatively connected with said cylinder and said reciprocable means for moving said piston in said cylinder to thereby discharge the dough therefrom.

14. A dough divider comprising a frame, a hopper fixed to said frame, a cylinder carried by said frame below said hopper, a dough withdrawing piston slidable in said cylinder, a rock lever pivotally carried by said frame, operating means connected to said lever, means connecting said lever with said piston, a tubular movable member disposed between said cylinder and said hopper, means fixed to said movable member communicating said hopper with said cylinder in one position of said movable member, operating means for said movable member, a forming cylinder carried by said movable member and adapted in another position of said movable member to be disposed in registry with said first cylinder, a piston slidable in said forming cylinder, and means active when said forming cylinder is out of registry with said first cylinder for moving said latter piston to thereby discharge the dough from said forming cylinder.

15. A dough divider comprising a frame, a hopper fixed to said frame, a cylinder carried by said frame below said hopper, a dough withdrawing piston slidable in said cylinder, a rock lever pivotally carried by said frame, operating means connecter to said lever, means connecting said lever with said piston, a tubular movable member disposed between said cylinder and said hopper, means fixed to said movable member communicating said hopper with said cylinder in one position of said movable member, operating means for said movable member, a forming cylinder carried by said movable member and adapted in another position of said movable member to be disposed in registry with said first cylinder, a piston slidable in said forming cylinder, means active when said forming cylinder is out of registry with said first cylinder for moving said latter piston to thereby discharge the dough from said forming cylinder, and an endless conveyor carried by said frame and disposed in a position to receive the dough discharged from said forming cylinder.

16. A dough divider comprising a frame, a hopper fixed to said frame, a cylinder carried by said frame below said hopper, a dough withdrawing piston slidable in said cylinder, a rock lever pivotally carried by said frame, operating means connected to said lever, means connecting said lever with said piston, a tubular movable member disposed between said cylinder and said hopper, means fixed to said movable member communicating said hopper with said cylinder in one position of said movable member, operating means for said movable member, a forming cylinder carried by said movable member and adapted in another position of said movable member to be disposed in registry with said first cylinder, a piston slidable in said forming cylinder, means active when said forming cylinder is out of registry with said first cylinder for moving said latter piston to thereby discharge the dough from said forming cylinder, and means regulating the rocking movement of said lever to thereby control the quantity of dough withdrawn from said hopper into said first cylinder.

17. A dough divider comprising a frame, a hopper fixed to said frame, a cylinder carried by said frame below said hopper, a dough withdrawing piston slidable in said cylinder, a rock lever pivotally carried by said frame, operating means connected to said lever, means connecting said lever with said piston, a tubular movable member disposed between said cylinder and said hopper, means fixed to said movable member communicating said hopper with said cylinder in one position of said movable member, operating means for said movable member, a forming cylinder carried by said movable member and adapted in another position of said movable member to be disposed in registry with said first cylinder, a piston slidable in said forming cylinder, means active when said forming cylinder is out of registry with said first cylinder for moving said latter piston to thereby discharge the dough from said forming cylinder, and cushioning means operatively connected to said lever for cushioning the movement of said first piston.

18. A dough divider comprising a frame, a hopper fixed to said frame, a cylinder carried by said frame below said hopper, a dough withdrawing piston slidable in said cylinder, a rock lever pivotally carried by said frame and operatively connected to said piston, operating means connected to said lever, a movable member disposed between said cylinder and said hopper, means carried by said movable member communicating said hopper with said cylinder in one position of said movable member, a forming cylinder carried by said movable member and adapted in another position of said movable member to be disposed in registry with said first cylinder, a piston slidable in said forming cylinder, a second rock lever, means connecting said second rock lever with said movable member, means connecting said second rock lever with said operating means, means for moving said second piston to discharging position, and means disposed in the path of movement of said second lever for activating said piston moving means.

19. A dough divider comprising a frame including a table, a stationary hopper carried by said table, oscillatable means interposed between said table and said hopper, operating means for said oscillatable means, suction means carried by and depending from said table for withdrawing the material from said hopper, operating means for said suction means, a combined receiving and discharging means carried by said oscillatable means and adapted in one position of said oscillatable means to register with said suction means for receiving therefrom the material removed from the hopper by said suction means, and means discharging the material from said combined receiving and discharging means.

20. In a dough dividing machine a primary and a secondary scaling cylinder, a piston in each cylinder, independent operating means for each piston, means operatively connected to each of said operating means whereby to simultaneously adjust said operating means to thereby regulate the strokes of each piston, and gauge means operatively connected to said latter means whereby to indicate the quantity of dough which may be discharged into said cylinders.

21. A dough divider comprising a frame including a table, a stationary hopper carried by said table, oscillatable means interposed between said table and said hopper, operating means for said oscillatable means, suction means carried by and depending from said table for withdrawing the material from said hopper, operating means for said suction means, a combined receiving and discharging means carried by said oscillatable means and adapted in one position of said oscillatable means to register with said suction means for receiving therefrom the material removed from the hopper by said suction means, and fluid actuated means discharging the material from said combined receiving and discharging means.

22. A dough divider comprising a frame including a table, a stationary hopper carried by said table, oscillatable means interposed between said table and said hopper, operating means for said oscillatatable means, suction means carried by and depending from said table for withdrawing the material from said hopper, operating means for said suction means, a combined receiving and discharging means carried by said oscillatable means and adapted in one position of said oscillatable means to register with said suction means for receiving therefrom the material removed from the hopper by said suction means, fluid actuated means discharging the material from said combined receiving and discharging means, and means engageable with said suction operating means when said suction means registers with said combined receiving and discharging means for effecting operation of said fluid actuated means.

23. A dough divider comprising a frame, a hopper carried by the frame, a member movably carried by said frame and disposed in operative relation to the discharge end of said hopper, suction means withdrawing a quantity of dough from the hopper, a combined receiving and forming means carried by said member, means for moving said member to initially register said hopper with said suction means and subsequently register said receiving and forming means with said suction means, and operating means for said member.

24. A dough divider comprising a hopper including a stationary part and a movable part, a reciprocable means having a suction stroke and a pressure stroke and active on the suction stroke to withdraw dough from said hopper, a combined receiving and forming means operatively connected to said movable hopper part, means for shifting said movable hopper part to initially register said movable hopper part with said stationary hopper part when said reciprocable means is operating on the suction stroke and to register said receiving and forming means with said reciprocable means when said latter means is operating on the pressure stroke whereby the dough is transferred to said receiving and forming means, and means active when said receiving and forming means is out of registry with said reciprocable means for discharging the dough therefrom.

25. A dough divider comprising a frame, a movable hopper means carried by said frame, a reciprocable means having a suction stroke and a pressure stroke and active on the suction stroke to withdraw dough from said hopper means, a combined receiving and forming means movable with said hopper means and registrable with said reciprocable means in the pressure stroke thereof, means for intermittently shifting said hopper means and said receiving and forming means, means for discharging the dough from said receiving and forming means, and means operatively connected to said reciprocable means and said discharging means for regulating the length of movement thereof.

26. A dough divider including a dough holding hopper, reciprocal means having a suction stroke and a pressure stroke and active on the suction stroke to withdraw a quantity of dough from the hopper, a combined dough receiving and forming means, means connected to said receiving and forming means for registering said receiving and forming means with said reciprocal means on the pressure stroke of the latter, said registering means simultaneously cutting off said hopper from said reciprocal means when said reciprocal means is on its pressure stroke, and operating means for said registering means.

27. A dough divider including a dough holding hopper, reciprocal means having a suction stroke and a pressure stroke and active on the suction stroke to withdraw a quantity of dough from the hopper, a combined dough receiving and forming means, means connected to said receiving and forming means for registering said receiving and forming means with said reciprocal means on the pressure stroke of the latter, said registering means simultaneously cutting off said hopper from said reciprocal means when said reciprocal means is on its pressure stroke, operating means for said registering means, and means for discharging the dough from said receiving and forming means when said hopper is in registry with said reciprocal means.

28. A dough divider including a dough holding hopper, reciprocal means having a suction stroke and a pressure stroke and active on the suction stroke to withdraw a quantity of dough from the hopper, a combined dough receiving and forming means, means connected to said receiving and forming means for registering said receiving and forming means with said reciprocal means on the pressure stroke of the latter, said registering means simultaneously cutting off said hopper from said reciprocal means when said reciprocal means is on its pressure stroke, operating means for said registering means, means for discharging the dough from said receiving and forming means when said hopper is in registry with said reciprocal means, and means simultaneously regulating the strokes of said reciprocal means and the movement of said discharge means.

ROY HINCKLEY CUNNINGHAM.